United States Patent
Famolari et al.

(10) Patent No.: US 8,345,599 B2
(45) Date of Patent: Jan. 1, 2013

(54) PRE-EVALUATION OF MULTIPLE NETWORK ACCESS POINTS

(75) Inventors: David Famolari, Stewartsville, NJ (US); Kyriakos Manousakis, New Brunswick, NJ (US); Kaustubh Sinkar, New Brunswick, NJ (US)

(73) Assignees: Telcordia Technologies, Inc., Piscataway, NJ (US); Kabushiki Kaisha Toshiba, Tokyo (JP)

(*) Notice: Subject to any disclaimer, the term of this patent is extended or adjusted under 35 U.S.C. 154(b) by 237 days.

(21) Appl. No.: 12/569,719

(22) Filed: Sep. 29, 2009

(65) Prior Publication Data

US 2010/0110921 A1  May 6, 2010

Related U.S. Application Data

(60) Provisional application No. 61/100,895, filed on Sep. 29, 2008.

(51) Int. Cl.
*H04W 4/00* (2009.01)

(52) U.S. Cl. .......... 370/328; 370/338; 455/434

(58) Field of Classification Search ........... 370/216, 370/231, 252, 229, 230, 310, 310.2, 311, 370/315, 328, 352, 342, 334, 338, 389, 400, 370/401, 419; 455/41.2, 408, 434, 424, 435.3, 455/436, 437, 411, 435.2, 456.1, 456.2, 512, 455/513; 709/224, 227, 220, 229, 250, 217, 709/226, 225
See application file for complete search history.

(56) References Cited

U.S. PATENT DOCUMENTS

| | | | | |
|---|---|---|---|---|
| 6,185,619 B1* | 2/2001 | Joffe et al. | | 709/229 |
| 6,779,032 B1* | 8/2004 | Hericourt | | 709/226 |
| 7,263,076 B1* | 8/2007 | Leibovitz et al. | | 370/310 |
| 2002/0069284 A1* | 6/2002 | Slemmer et al. | | 709/227 |
| 2002/0129137 A1* | 9/2002 | Mills et al. | | 709/224 |
| 2004/0066759 A1* | 4/2004 | Molteni et al. | | 370/329 |
| 2005/0063401 A1 | 3/2005 | Kenner et al. | | |
| 2005/0071476 A1* | 3/2005 | Tejaswini et al. | | 709/227 |
| 2005/0083899 A1* | 4/2005 | Babbar et al. | | 370/342 |
| 2006/0067214 A1* | 3/2006 | Ramachandran | | 370/229 |
| 2006/0167784 A1 | 7/2006 | Hoffberg | | |
| 2006/0221901 A1* | 10/2006 | Yaqub et al. | | 370/331 |

(Continued)

FOREIGN PATENT DOCUMENTS

JP 2002-506543 A 2/2002

(Continued)

OTHER PUBLICATIONS

International Search Report of PCT/US2009/058866, date of mailing Dec. 2, 2009.

(Continued)

*Primary Examiner* — Abdullah Riyami
(74) *Attorney, Agent, or Firm* — Westerman, Hattori, Daniels & Adrian, LLP

(57) ABSTRACT

The present application describes, inter alia, novel techniques to perform pre-evaluations of multiple Wi-Fi Access Points (AP) and Access Networks (AN). A pre-evaluation determines whether or not an AP is connected to the Internet and measures the path performance that the AN, via that particular AP, can offer between the mobile device and a pre-specified Internet host. In addition, the invention also discloses methods to determine whether the AN requires a user to actively authenticate themselves through a redirect log-on page.

40 Claims, 4 Drawing Sheets

U.S. PATENT DOCUMENTS

| | | | |
|---|---|---|---|
| 2006/0245367 A1* | 11/2006 | Jeffery et al. | 370/248 |
| 2006/0285514 A1* | 12/2006 | Hoerl et al. | 370/328 |
| 2007/0004428 A1* | 1/2007 | Morgan et al. | 455/456.1 |
| 2007/0053305 A1* | 3/2007 | Liu | 370/251 |
| 2007/0093247 A1* | 4/2007 | Yaqub | 455/436 |
| 2007/0110035 A1* | 5/2007 | Bennett | 370/352 |
| 2007/0110080 A1* | 5/2007 | Bennett | 370/400 |
| 2007/0115987 A1* | 5/2007 | Hoekstra | 370/392 |
| 2007/0127409 A1* | 6/2007 | Leon et al. | 370/328 |
| 2007/0178876 A1* | 8/2007 | Yaqub et al. | 455/343.1 |
| 2007/0275701 A1* | 11/2007 | Jonker | 455/414.1 |
| 2008/0056133 A1* | 3/2008 | Deshpande et al. | 370/235 |
| 2008/0102815 A1* | 5/2008 | Sengupta et al. | 455/424 |
| 2008/0148379 A1* | 6/2008 | Xu et al. | 726/11 |
| 2008/0151842 A1* | 6/2008 | Tysowski et al. | 370/338 |
| 2008/0198811 A1* | 8/2008 | Deshpande et al. | 370/332 |
| 2008/0214232 A1* | 9/2008 | Ozluturk | 455/552.1 |
| 2008/0293404 A1* | 11/2008 | Scherzer et al. | 455/426.1 |
| 2009/0006616 A1* | 1/2009 | Gore et al. | 709/224 |
| 2009/0124284 A1* | 5/2009 | Scherzer et al. | 455/552.1 |
| 2009/0209250 A1* | 8/2009 | Huq | 455/425 |
| 2009/0219819 A1* | 9/2009 | Haverinen et al. | 370/241 |
| 2009/0219846 A1* | 9/2009 | Chan et al. | 370/311 |
| 2009/0245176 A1* | 10/2009 | Balasubramanian et al. | 370/328 |
| 2009/0268691 A1* | 10/2009 | Aramaki et al. | 370/332 |
| 2010/0144339 A1* | 6/2010 | Hasegawa et al. | 455/424 |
| 2010/0189078 A1* | 7/2010 | Famolari | 370/331 |
| 2011/0026487 A1* | 2/2011 | Karaoguz et al. | 370/331 |

FOREIGN PATENT DOCUMENTS

JP    2008-503109 A    1/2008

OTHER PUBLICATIONS

Notice of Reasons for Rejection dated Sep. 25, 2012, issued in corresponding Japanese Patent Application No. 2011-529370, with English translation (6 pages).

* cited by examiner

PRE-EVALUATION OF MULTIPLE NETWORK ACCESS POINTS

The present application is a non-provisional of U.S. provisional application Ser. No. 61/100,895 entitled Pre-Evaluation of Multiple Wi-Fi Access Points, filed on Sep. 29, 2008, the entire disclosure of which is incorporated herein by reference.

BACKGROUND

The preferred embodiments of the present invention relate to wireless mobile device access to networks via access points, and the preferred embodiments provide novel systems and methods for evaluation and selection of access points.

BACKGROUND DISCUSSION

Networks and Internet Protocol

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier. IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. The layers of the OSI model are listed below. Layer 7 (i.e., the application layer) is a layer at which, e.g., communication partners are identified, quality of service is identified, user authentication and privacy are considered, constraints on data syntax are identified, etc. Layer 6 (i.e., the presentation layer) is a layer that, e.g., converts incoming and outgoing data from one presentation format to another, etc. Layer 5 (i.e., the session layer) is a layer that, e.g., sets up, coordinates, and terminates conversations, exchanges and dialogs between the applications, etc. Layer-4 (i.e., the transport layer) is a layer that, e.g., manages end-to-end control and error-checking, etc. Layer-3 (i.e., the network layer) is a layer that, e.g., handles routing and forwarding, etc. Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery. Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (e.g., outside mobile IP), routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Media Independent Handover Services:

In I.E.E.E. P802.21/D.01.09, September 2006, entitled Draft IEEE Standard for Local and Metropolitan Area Networks: Media Independent Handover Services, among other things, the document specifies 802 media access-independent mechanisms that optimize handovers between 802 systems and cellular systems. The I.E.E.E. 802.21 standard defines extensible media access independent mechanisms that enable the optimization of handovers between heterogeneous 802 systems and may facilitate handovers between 802 systems and cellular systems. For background reference and education purposes, portions of said I.E.E.E. 802.21 are reproduced below.

The scope of the IEEE 802.21 (Media Independent Handover) standard is to develop a specification that provides link layer intelligence and other related network information to upper layers to optimize handovers between heterogeneous media. This includes links specified by 3GPP, 3GPP2 and both wired and wireless media in the IEEE 802 family of standards. Note, in this document, unless otherwise noted, "media" refers to method/mode of accessing a telecommunication system (e.g. cable, radio, satellite, etc.), as opposed to sensory aspects of communication (e.g. audio, video, etc.). See, e.g., 1.1 of I.E.E.E. P802.21/D.01.09, September 2006, entitled Draft IEEE Standard for Local and Metropolitan Area Networks: Media Independent Handover Services, the entire contents of which document is incorporated herein into and as part of this patent application via being fully incorporated within PART C of the above-referenced provisional application. See Id.

Illustrative Architecture:

FIG. 1 depicts some illustrative architectural components that can be employed in some illustrative and non-limiting implementations including wireless access points to which client devices communicate. In this regard, FIG. 1 shows an illustrative wireline network 20 connected to a wireless local area network (WLAN) generally designated 21. The WLAN 21 includes an access point (AP) 22 and a number of user stations 23, 24. For example, the wireline network 20 can include the Internet or a corporate data processing network. For example, the access point 22 can be a wireless router, and the user stations 23, 24 can be, e.g., portable computers, personal desk-top computers, PDAs, portable voice-over-IP telephones and/or other devices. The access point 22 has a network interface 25 linked to the wireline network 21, and a wireless transceiver in communication with the user stations 23, 24. For example, the wireless transceiver 26 can include an antenna 27 for radio or microwave frequency communication with the user stations 23, 25. The access point 22 also has a processor 28, a program memory 29, and a random access memory 31. The user station 23 has a wireless transceiver 35 including an antenna 36 for communication with the access point station 22. In a similar fashion, the user station 24 has a wireless transceiver 38 and an antenna 39 for communication to the access point 22. By way of example, in some embodiments an authenticator could be employed within such an access point (AP) and/or a supplicant or peer could be employed within a mobile node or user station.

FIG. 2 shows an illustrative computer or control unit that can be used to implement computerized process steps, to be carried out by devices, such as, e.g., an access point, a computer, a server, a user station, a mobile node or other node in some embodiments. In some embodiments, the computer or control unit includes a central processing unit (CPU) 322, which can communicate with a set of input/output (I/O) device(s) 324 over a bus 326. The I/O devices 324 can include, for example, a keyboard, monitor, and/or other devices. The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, e.g., data 330. The memory 328 can also store software 338. The software 338 can include a number of modules 340 for implementing the steps of processes. Conventional programming techniques may be used to implement these modules. Memory 328 can also store the above and/or other data file(s). In some embodiments, the various methods described herein may be implemented via a computer program product for use with a computer system. This implementation may, for example, include a series of computer instructions fixed on a computer readable medium (e.g., a diskette, a CD-ROM, ROM or the like) or transmittable to a computer system via and interface device, such as a modem or the like. A communication medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

SUMMARY

The preferred embodiments of the present invention improve upon the foregoing and other background technologies.

In the preferred embodiments, novel techniques perform pre-evaluations of multiple Wi-Fi Access Points (AP) and Access Networks (AN). A pre-evaluation determines whether or not an AP is connected to the Internet and measures the path performance that the AN, via that particular AP, can offer between the mobile device and a pre-specified Internet host. In addition, the invention also discloses methods to determine whether the AN requires a user to actively authenticate themselves through a redirect log-on page.

In some embodiments, a system, method or device configured to intelligently and quickly evaluate a large number of Wi-Fi hotspots is provided. In some examples, the evaluations provide information not only about their physical layer attributes. In some examples, the evaluations provide information about signal strength, MAC addresses, nominal bit rates, or transmission technologies and also information about their Network-level attributes. In some examples, the information about Network-level attributes includes Internet connectivity, redirect-policies, or path performance. In some examples, the system, method or device further includes prioritizing the evaluations based on the user's past history with an AP, whether or not the AP's information is already stored in the user's profile (e.g., SSID, WEP-key or other security credentials, etc.), the AP's operational status (ad hoc, peer-to-peer, infrastructure, etc.) or other attributes. In some examples, the system, method or device further includes first evaluating APs that the client has previously associated with. In some examples, the system, method or device further includes utilizing multiple Wi-Fi chipsets in parallel to perform evaluations of available Wi-Fi APS.

According to some embodiments, a system for evaluation of one or more access point(s) to an access network prior to a wireless mobile device establishing a data communication session via one of the access points to the access network is provided that includes: a mobile device having at least one radio interface for communication with access points to an access network; the mobile device being configured to collect information broadcasted by the access points and to detect link layer characteristics between the access points and the mobile device; the mobile device being configured to automatically select or enable user-driven selection of at least one test correspondent for evaluation of network level attributes of the access points; the mobile device having a connection manager that performs an evaluation of the access points based on both a) the broadcasted information and the link layer characteristics between the access points and the mobile devices and b) the network level attributes of the access points.

According to some embodiments, a system for evaluation of access points to an access network prior to a wireless mobile device establishing a data communication session via one of the access points to the access network is provided that includes: a mobile device configured to receive information wirelessly transmitted from multiple access points; the mobile device being configured to perform an evaluation of a plurality of access points via which the mobile device does not have an on-going data session based on both physical layer attributes of the access points and network level attributes of the access points such as to evaluate not only physical layer attributes but also networking status of the access points. In some examples, the mobile device is configured to perform the evaluation based on communications with at least one test correspondent that exchanges IP-level or above packets with the mobile device. In some examples, the physical layer attributes include one or more of signal strength, MAC addresses, nominal bit rates, and transmission technologies. In some examples, the network level attributes include one or more of Internet connectivity, redirect-policies, and path performance. In some examples, the mobile device is configured with a user-driven mode in which a user physically initiates performance of the evaluation and/or physically selects access points based on the evaluation via a user interface; and in some examples, the mobile device is configured with an automatic mode in which the device automatically performs the evaluation and/or automatically selects access points based on the evaluation. In some preferred embodiments, the mobile device is configured to perform a connectivity evaluation and/or a performance evaluation with at least one test correspondent.

According to some other embodiments, a method for the evaluation of one or more access point(s) to an access network prior to a wireless mobile device establishing a data communication session via one of the access points to said access network is provided that includes: collecting, with a mobile device that has at least one radio interface for communication with one or more access point(s) to an access network, information broadcasted by the access points and detecting link layer characteristics between the access point(s) and the mobile device; automatically selecting or enabling user-driven selection of at least one test correspondent for evaluation of network level attributes of the access point(s); having a connection manager of said mobile device perform an evaluation of the access points based on both a) said broadcasted information and said link layer characteristics between the access point(s) and the mobile devices and b) said network level attributes of said access point(s).

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DISCUSSION OF THE PREFERRED EMBODIMENTS

Figure 1:
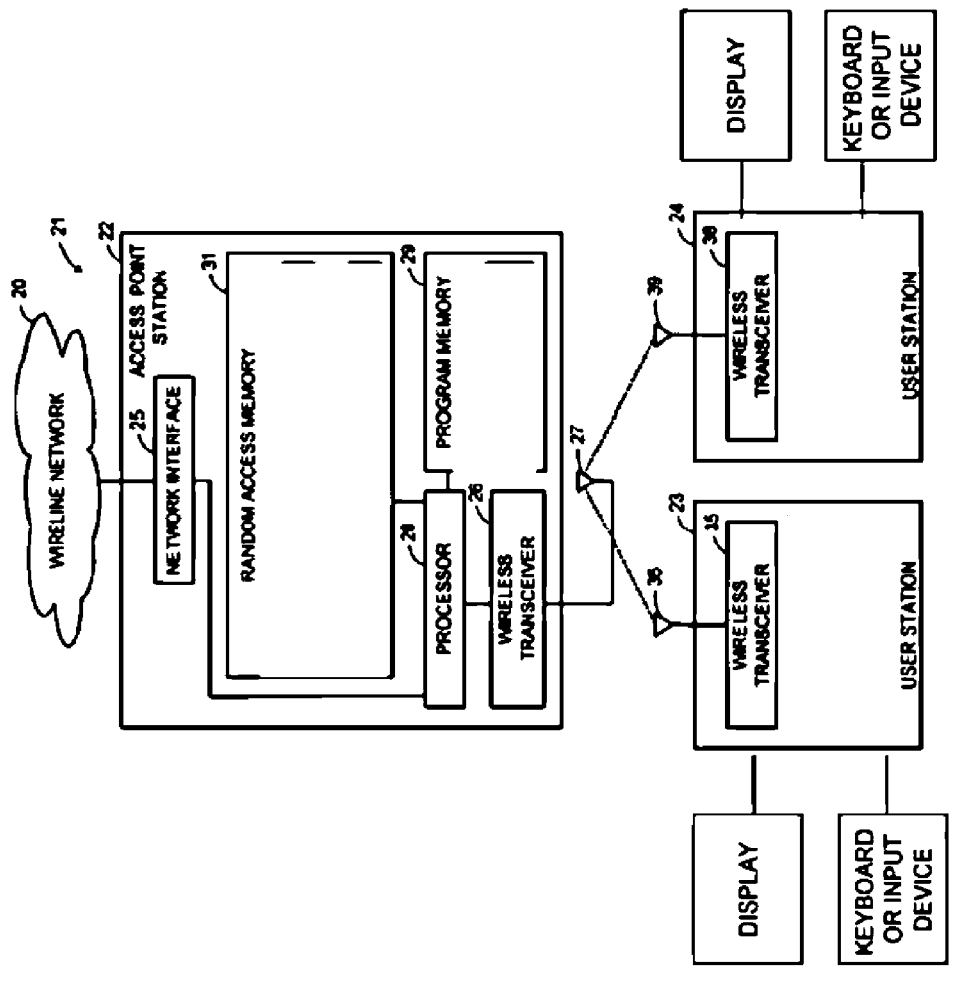
FIG. 1 is an illustrative architectural diagram demonstrating illustrative components of system architecture according to some examples.
Figure 2:
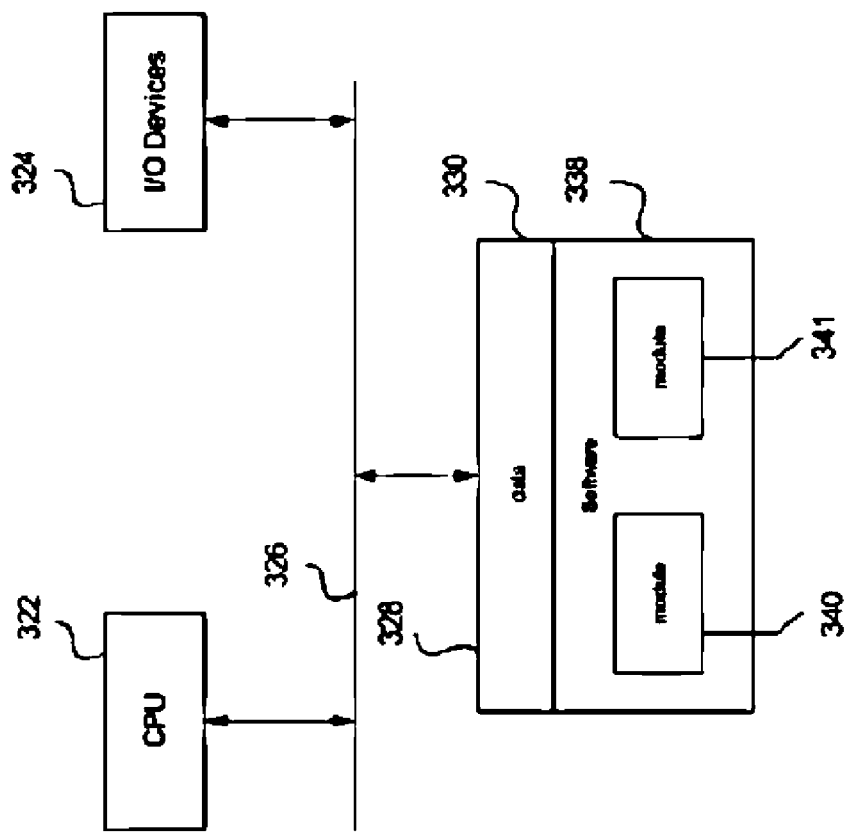
FIG. 2 shows features according to an illustrative computer or control unit that can be used to implement computerized process steps, to be carried out by devices, such as, e.g., an access point, a user station, a source node or destination node in some embodiments.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

THE PREFERRED EMBODIMENTS

In some of the preferred embodiments, novel techniques are provided in relation to performing pre-evaluations of multiple Wi-Fi Access Points (AP) and Access Networks (AN). In preferred embodiments, a pre-evaluation determines whether or not an AP is connected to the Internet and measures the path performance that the AN, via that particular AP, can offer between the mobile device and a pre-specified Internet host. In addition, the preferred embodiments also involve methods to determine whether the AN requires a user to actively authenticate themselves through a redirect log-on page.

Methodology:

In the preferred embodiments, a Wi-Fi Client (WC) device needs to be able to scan for available Wi-Fi Access Points. Typically, this involves scanning the available frequency channels and listening for beacons transmitted by nearby Access Points (APs). Beacon messages contain the MAC address and the ESSID values of the AP that transmitted them.

Often, many areas are covered by multiple APs. For example, this can be typical of office environments, crowded downtown environments, coffee shops, etc. In such cases, the WC will see many different Wi-Fi APs. Current state of the art connection management software will catalog the associated MAC addresses, ESSIDs and other parameters associated with the APs.

The current state of the art connection management software can only collect information that is either pre-populated and pre-configured on the AP (such as, e.g., ESSID) or describe dynamic attributes that pertain only to the link layer (e.g., signal strength, bit error rates, etc.). Current connection management software does not provide information about the networking status of the APs, including whether or not they are connected to the Internet, if they are connected to the Internet, what path performance (measured in terms of, e.g., available throughput, delay and/or jitter) the AP and its associated Access Network (AN) offer or whether the AP requires any manual intervention in order to enter access and authentication credentials.

According to the preferred embodiments, the shortcomings of current Wi-Fi connection management software can be addressed by, e.g., making it possible to learn such information.

Entities:

In the preferred embodiments, the following entities can be involved:
1) A Wi-Fi Client (WC), which includes a client device that contains at least one Wi-Fi radio, and can include more.
2) A Wi-Fi Access Point (AP), which includes, e.g., a Wi-Fi radio transceiver that exchanges Wi-Fi messages with the WC. These APs have certain parameters assigned to them including, e.g., a MAC address and ESSID.
3) A Test Correspondent, which includes, e.g., an IP-level entity that exchanges IP-level and above packets with the WC. The Test Correspondent can be, e.g., a web-server, another WC, or any other network entity.
4) A Service Provider, which is a carrier who operates and manages a network accessible by the WC.

Figure 3:
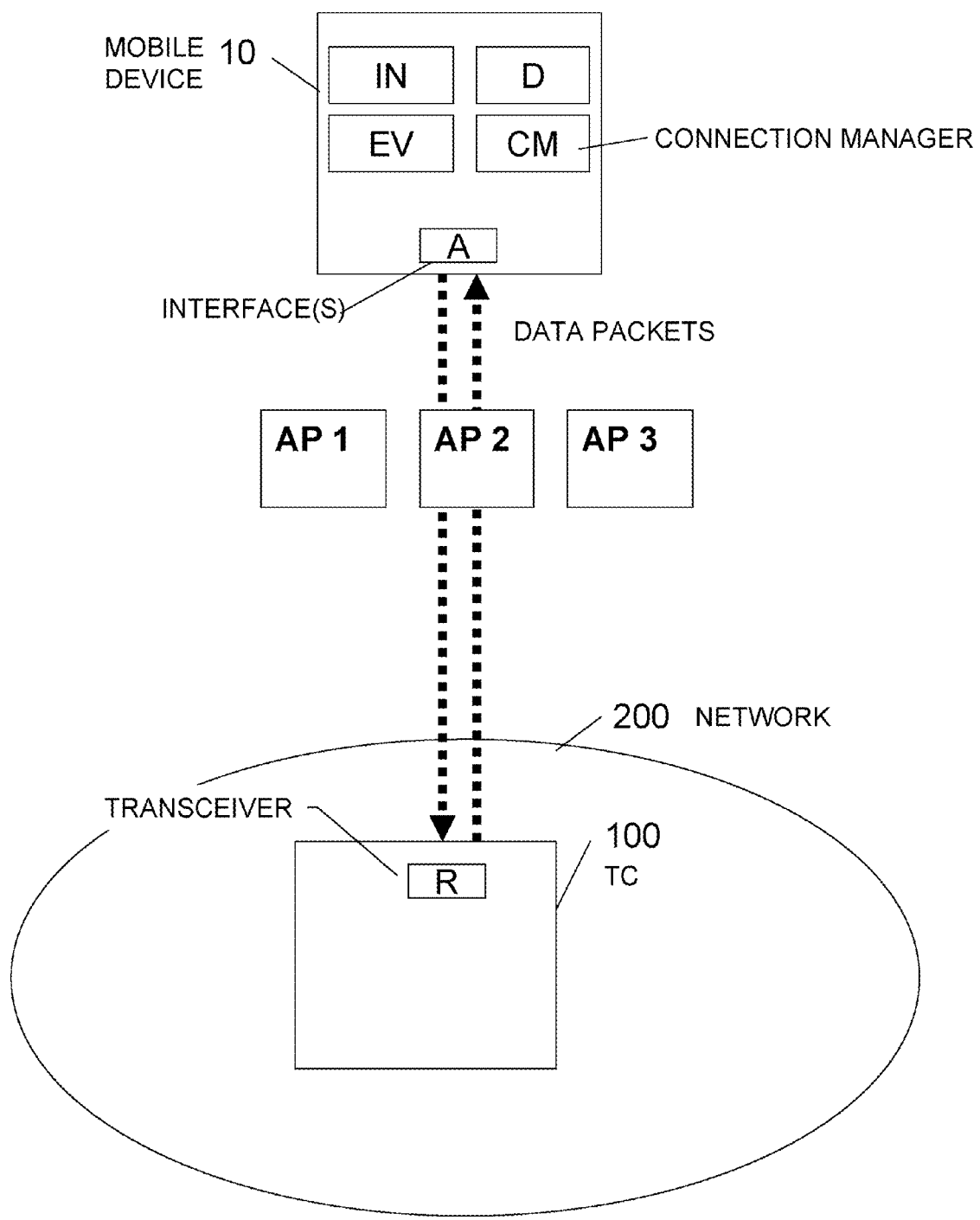
FIG. 3 shows an illustrative architecture according to some illustrative examples of the present invention.

By way of example, FIG. 3 shows an illustrative example of a mobile device 10 (e.g., Wi-Fi Client WC) having a user interface IN (such as, e.g., a graphical user interface), a display D (which can, in some embodiments, be used as part of the graphical user interface for display and input (e.g., as a touch screen), an evaluation module EV (which can be implemented via, e.g., software, hardware or firmware) configured to perform evaluation method as set forth herein, and a connection manager module CM (which can similarly be implemented via, e.g., software, hardware or firmware) to perform connection management based on said evaluations as set forth herein (it should be appreciated that the evaluation module and the connection manager can be integrated together and do not need to be separate modules), and one or more radio interfaces A. As shown in FIG. 3, the mobile device 10 can obtain access to an access network via one or more access point (e.g., AP 1, AP2 and AP3 in this example), and a test correspondent (TC) 100 located within a network 200 is employed for evaluation of the access points as set forth below.

FURTHER DISCUSSION

In some embodiments, a system, method and/or device is provided that can intelligently and quickly evaluate, e.g., a large number of Wi-Fi hotspots. Preferably, the evaluations provide information not only about their physical layer attributes, such as, e.g., signal strength, MAC addresses, nominal bit rates, and/or transmission technologies, but also information about their Network-level attributes such as, e.g., Internet connectivity, redirect-policies, path performance and other attributes.

In the preferred embodiments, a method according to the present invention prioritizes the evaluations based on the user's past history with the AP, whether or not the AP's information is already stored in the user's profile (e.g., SSID, WEP-key or other security credentials, etc.), the AP's operational status (e.g., ad hoc, peer-to-peer, infrastructure, etc.) and other attributes.

In the preferred embodiments, a method according to the present invention will first evaluate APs that the client has previously associated with.

In the preferred embodiments, a method according to the present invention will also include ways to utilize multiple Wi-Fi chipsets in parallel to perform evaluations of available Wi-Fi APS.

In the preferred embodiments, a method according to the present invention will set timer limits for how long a single evaluation can take and will stop.

(Note: In some embodiments, the method could perform multiple checks simultaneously on different frequencies by, e.g., allocating a set of times. For example, in some embodiments, the device can send an Auth Request on one channel and then immediately tune to another channel and issue another Auth Request. The client can then hop back-and-forth between the two channels to process the two requests simultaneously. In some instances, the system can be adapted to employ radios best adapted for fast switching, to address loss of time synchronization, and/or to exploit any known periodicity to Auth Responses).

In some embodiments, scans will be organized according to both connectivity scans and performance scans. Preferably, the device will also be able to operate in both an automated mode and a user-driven mode. In the automated mode, the scanning process preferably occurs in the background and does not require user intervention. In addition, the automated mode preferably involves the performance of connectivity tests and path performance checks.

The preferred embodiments of the present invention involve, e.g., an evaluation process that comprises, e.g., collecting data, grouping APs, ranking APs within groups, determining an order of execution across groups, the determination of testing partners, the IP connectivity and end-to-end path performance evaluation procedure for both a single radio Wi-Fi device and a multi-radio Wi-Fi device.

Automated Mode:

In some embodiments, a system, method and/or device can be provided that performs an automated mode including features as set forth below.

1) Collection of AP data:
  a. In this scenario, the evaluation process preferably happens in the background and does not require user intervention or action.
  b. The method, system and device preferably collect information that is broadcast by nearby Wi-Fi hotspots. This information includes, e.g., the MAC address, the SSID, the operating mode, the transmission technology and the security status of all the Wi-Fi APs that have been detected by the device's underlying Wi-Fi capabilities.
  c. The collection process preferably also detects certain information from each AP pertaining to characteristics of the link-layer that exists between the AP and the client device. This information includes, e.g., signal strength, available resources (% utilization), nominal bit rate, interference levels, channel frequency and any other parameters that define the AP's link to the client.

2) Grouping of APs:
  a. The Grouping Process preferably sorts the information collected from the Wi-Fi software.
  b. The Grouping Process preferably groups all entries associated with detected Wi-Fi connections that are ad-hoc or peer-to-peer modes in one group labeled "Others", or some other descriptive term. The Evaluation Process preferably only involves evaluations of infrastructure mode APs.
  c. The Grouping process preferably includes identifying those APs that are already present in the user's profile. These are preferably AP's that the user already has security credentials for, such as, e.g., WEP keys, etc.
  d. Preferably, the APs already in the user's profile are grouped together in Group 1. Preferably, the APs that have open security policies (e.g., that do not require WEP or other information to be known before hand) but are not currently in the user's profile are also grouped together in Group 2. Finally, the APs that are security enabled and are not already part of the user's profile are preferably grouped together in Group 3. Preferably, the APs determined to be operating in the ad hoc or peer-to-peer modes will be grouped in Group Other.

3) Ranking of APs within Groups:
  a. Once the APs have been grouped, they are preferably rank-ordered by the Ranking Process within their groups.
  b. Preferably, the Ranking Process will assign positions to each AP within each group in order to produce an ordered list of APs for each of the groups.
  c. In one embodiment, this ranking is performed based on the alphabetical ordering of the AP's SSID.
  d. In another embodiment, this ranking is performed based on the signal strength of the AP with the APs with the highest signal strength listed above those with lower strengths.
  e. In another embodiment, APs within each group are ranked from highest nominal channel rate to lowest.
  f. In another embodiment, APs within each group are ranked according to their technology classification (such as, e.g., 802.11a, b, g, n). For example, this can involve those that advertise support of 11n technologies are listed first, then 11 g, then 11a and finally 11b.
  g. In another embodiment, APs are grouped according to their technologies and then further sub-grouped according to their received signal strengths.
  h. In another embodiment, APs are grouped according to how frequently they have been used by the client device in a certain time period (e.g., the last X days). In this example, the time-period value X can be a user-defined value so that users can choose to have more time-sensitive rankings.
  i. In another embodiment, APs can be grouped according to how they are tagged by the user. In some embodiments, the user can decide to tag an AP with some metadata that helps the user organize APs according to their folksonomy. For example, a user may tag an AP "coffeeshop" or "work" or "home" or "Dave's house"—and these tags have nothing to do with any of the AP attributes such as, e.g., SSID. Preferably, they provide a succinct and personal way for users to organize the APs they come into contact with. A single AP, for example, can be tagged with multiple tags. This method allows users to categorize APs according to multiple attributes that they find useful or meaningful.

j. Other groupings can be employed in other embodiments.
4) Order of Evaluations:
a. In some embodiments, the process begins by evaluating those APs within Group 1 first.
   i. In this case, the Evaluation Process preferably begins with the first AP listed in Group 1. Preferably, it completes the connectivity check and then performs a subsequent check on the next AP listed in Group 1. Preferably, the Evaluation Process continues in this fashion until all Group 1 APs have been evaluated for connectivity. Once this happens, the process moves to Group 2 and evaluates all those APs from top to bottom.
b. In some other embodiments, the process preferably begins evaluating those APs within Group 2 first.
   i. In this case, all APs in Group 2 are evaluated according to their rank ordering. Once all the Group 2 APs have been evaluated, the process begins the evaluation process on those APs in Group 1.
   ii. This embodiment is helpful since it evaluates new or unseen APs first.
c. In some other embodiments, alternates evaluations between Groups 1 and 2 can be employed.
   i. In this case, the process can, e.g., evaluate the first AP from Group 1 and then the first AP from Group 2, then the second AP from Group 1 and the second AP from Group 2, and so on until all APs in Groups 1 and 2 have been evaluated.
d. The order of evaluations within the Groups happens according to the AP rankings within those groups.
5) Evaluation Procedure & Testing Parties:
a. In some embodiments, the evaluation procedure itself (for the connectivity checking mode) includes, e.g., obtaining an IP address and attempting to initiate data transfers with a group of Internet hosts (called the testing parties).
b. The testing parties are preferably a collection of Internet-accessible hosts. They can be specified by the user or remotely by service providers and can be websites like google.com or cnn.com, or can be another Internet-accessible host such as, e.g., FTP servers, etc.
c. The testing parties can also be determined by the system. In such cases, the Evaluation software can, e.g., automatically populate the set of testing hosts based on, e.g., the most recent visited hosts by the user.
d. In some embodiments, the testing parties can be determined by the evaluation software according to which Internet hosts are the most frequently visited.
e. In some embodiments, the testing parties can be determined by the evaluation software according to which hosts are the most frequently visited within a certain past period of time, such as, e.g., the last day, last week, last month, etc.
f. In some embodiments, the testing parties can be determined based on time-of-day. The system can, e.g., store history logs of the devices Internet access attempts and correlate certain sites with certain times of day. In such a fashion the system can use testing parties that have a high likely of being accessed based on the time that the test evaluation is conducted.
g. In some embodiments, the testing parties can be determined based on the AP under test. For example, the device may frequently use a particular Internet host, such as a work server or other host when they are connected to a particular Wi-Fi AP. The software can, e.g., store associations of Internet access attempts with serving Wi-Fi APs and can use this information to populate the testing parties for each particular test. (This is a noteworthy feature. For example, this can involve, e.g., a history of Internet access attempts tied to location as well as serving AP or network. In some embodiments, this can involve a history indexed not only to Internet sites visited but also to, e.g., day, time of day, geographic location and/or serving AP or network).
   i. The association between testing party and AP in this embodiment can be based on, e.g., the AP's MAC address, SSID, Network Name or other parameters that are broadcast or inferred from the AP.
   ii. Another method to associate testing party and AP can be based on, e.g., the user-generated tags that are applied to the APs. Therefore, if a particular AP is tagged by a user with the tag "Work", that tag can be associated with a set of testing parties related to that user's work environment.
h. The user can specify how many testing parties should be used for connectivity evaluations.
i. In some embodiments, a mobile device is configured to initiate the evaluation procedure upon detection of poor application-layer performance of an on-going application. In some examples, the mobile device will have a module that analyses application-layer performance (such, as, e.g., packet loss, delay, etc.) can either a) automatically initiate evaluation or b) present the user with a message to enable the user to select to start such an evaluation.
j. In some embodiments, the mobile device can be configured to track or identify available power (such as, e.g., battery power level) and to modify the extent or occurrence of access point evaluation based on such battery power level. For example, in some embodiments, the mobile device can be configured to limit the number of evaluations based on the mobile devices remaining battery power.
6) Evaluation Procedure—Internet Connectivity:
a. In some embodiments, the following procedure can be used to determine if APs have Internet Connectivity
b. One embodiment can include to use a ping message (e.g., ICMP ECHO) to ping each of the testing parties. The evaluation software can store the ping results (e.g., response times and number of successful responses, expressed as a percentage of attempts). In the connectivity evaluation only mode, the evaluation is only concerned with whether or not the Wi-Fi AP has internet connectivity.
c. One embodiment can include to initiate an HTTP Request and Response exchange with each of the testing parties. In this case, the HTTP Response will preferably be collected by the evaluation software to determine the type of connectivity.
   i. For example, if the HTTP response comes from the target testing party, this indicates that the AP has internet connectivity.
   ii. If the HTTP response comes from an entity other than the target testing party, this may be indicative of, e.g., a Walled Garden AP. A Walled Garden AP will redirect users to an authentication or log-on page in order for them to manually input security credentials and obtain access to the larger Internet. The evaluation software will identify those APs that will redirect users to log-on pages and visually indicate this fact to users. (This is also a noteworthy feature and has substantial advantages over the background art.)

7) Evaluation Procedure:
a. In some embodiments, the following procedures can be used to determine end-to-end path performance of the AP.
b. One embodiment can use, e.g., ICMP ping messages to record the throughput and delay characteristics between the user's client device, the AP under test and the specified testing party.
   i. In this case, ping results will be associated with each testing party for each AP that has been tested. The aggregate effect of these multiple tests per AP will give the user more confidence in the offered performance of the AP under test.
c. Another embodiment can use, e.g., HTTP request and response messages. The initial HTTP request message is time-stamped and recorded. When the corresponding HTTP response message is received, the time elapsed since the transmission of the HTTP request message is determined. This is the round trip time for that testing party under that AP under test.
   i. Round trip times for each of the testing parties for each AP under test are recorded, stored and analyzed.
   ii. The sizes of the HTTP request and response messages are also recorded. Another embodiment for performance measurement involves dividing the total byte size of the HTTP request and response messages by the roundtrip time to arrive at an estimate of available throughput.
8) Timing of Evaluations:
a. Single Radio Mode with On-going Wi-Fi session.
   i. When performing evaluations on a device that contains only a single Wi-Fi radio and that is currently engaged in an on-going data session over an existing Wi-Fi connection, it can be necessary to disassociate from the current serving AP to evaluate the connectivity of other available Wi-Fi APs.
   ii. For the above cases, the method can, e.g., recognize when there is an on-going session and delay the evaluation procedure.
      1. For example, one embodiment is to have the evaluation process wait until there a period of inactivity on the Wi-Fi channel before initiating an evaluation procedure. This time value, referred to as Twait, can be set by the user or be pre-configured. In these situations the evaluation process must observe a period of Twait seconds before beginning to evaluate the available Wi-Fi APs.
      2. Another embodiment involves the EP (evaluation procedure) limit the number of evaluations that it conducts so as to reduce the time the single Wi-Fi radio is used for evaluation purposes. This will limit the impact on the existing sessions being delivered over the current, associated AP.
      3. Another embodiment invokes the EP process only when there is an event (Event-based Evaluation). In this case, an event may be the degradation of the currently signal from the current AP (as measured in terms of received signal power) OR the deterioration of application performance, such as a marked increase in packet delay, jitter as well as decrease in observed throughput. This last point is noteworthy as, e.g., it links application performance with evaluation trigger rather than lower-layer radio performance, as is the current practice. This linking more closely addresses the ultimate end-user experience.
b. Single-Radio without on-going Wi-Fi session.
   i. In the absence of an on-going Wi-Fi session, the user's device can freely evaluate potential APs without worrying about disrupting on-going sessions and no special considerations need to be made.
c. Multi-Radio Mode.
   i. When the device has more than one Wi-Fi radio, the evaluations can be assigned to the different radios according the radio's current usage.
   ii. One embodiment involves a device that contains multiple Wi-Fi chipsets that can be operated independently and be independently and simultaneously tuned to various channel frequencies that support a variety of WLAN technologies (such as, e.g., 802.11a, 802.11b, 802.11g, 802.11n, etc.)
      1. With such a device, one group of radios can serve as the "serving radio", which will be dedicated to servicing user data traffic. Other groups of radios can be used as "scanning" radios, which will be dedicated to identifying and evaluating available Wi-Fi APs other than the APs that are currently associated with the Serving group of Radios.
      2. With separate Serving and Scanning radios, Wi-Fi AP evaluations can occur simultaneously and independently from the user data traffic that is being delivered over the Serving radios. In this fashion, there is no interruption in user applications.
      3. With multiple radios within the Scanning Group, multiple evaluations can proceed simultaneously.
      4. Many algorithms to assign Scanning Group radios to evaluate identify Wi-Fi APs are possible.
         a. One such algorithm classifies identified APs according to their device technology (e.g., 11a, 11b, 11g, 11n, etc.) and attempts to assign evaluations of similar radio technology APs to specific radios within the Scanning Group. For example, one radio can be assigned to 11a APs while another radio is assigned to 11b and so on.
         b. Another algorithm follows on from the strategies discussed in the single radio case above. Here, radios within the Scanning group can be assigned to evaluate APs within specific AP Groups as discussed above.
         c. Another alternative is to assign multiple scanning radios to a single AP group so as to complete all the evaluations within that group before evaluating APs from other groups.
9) Reporting of Results:
a. Involves the display of results as well as the aggregation of multiple result instances for each AP under test.
   i. One embodiment averages throughput and delay results across testing parties for each AP under test.
   ii. One embodiment reports the median throughput and delay results across testing parties for each AP under test.
   iii. One embodiment reports the extreme, average and median values across all APs under test for each testing party. (This approach presents performance results centered on the testing party [website, server, etc.] rather than on the AP choices. So, if a user were primarily interested in the best service to a specific host, this option may be the most informative).
   iv. One embodiment presents confidence intervals based on prior test measurements, if available. Confidence intervals can be specified by the user or have default values such as, e.g., 95%, etc.

b. How to summarize the test results.
   i. Comparative and relative
   ii. Absolute.
   iii. Gradation—Red, Yellow, Green based on absolute basis.
   iv. Gradation—Red, Yellow, Green based on relative basis.
   v. Gradation—RYG categorized based on appropriateness for certain application types.
   vi. Notification of extreme performers. One embodiment would involve the notification of results when there is already an on-going and active connection.
      1. In this case, one embodiment would be to notify the user (e.g., audibly, through a change in icon status and/or via small notification window) only when a new connectivity option was evaluated to have much stronger performance than the currently serving connection. The notion of "much stronger" can be user defined or have default values. A value can be expressed in terms of percentages (X % better throughput than currently experiencing, for example; or Y % better delay than currently experience, etc.). "Much better" may be operationalized as a set of absolute values as well (X Mbps throughput or Y ms delay, for example).
      2. This scenario reduces the visual and information clutter presented to the user and only notifies them when a new connectivity option has been determined to offer significantly improved performance.
10) Storage, Analysis and Display of Results:
a. In some embodiments, the system stores evaluation results in a database, which database can be used for presenting results to a user (e.g., via a display of the mobile device), transmitting results from the mobile device to another mobile device, to a remote server and/or to another entity, for further analysis of the results and/or for modified presentation of results to a user. Our some embodiments, the mobile device is configured to store evaluation results and be configured to index them by, e.g., a number of parameters including, e.g., identifiers (such as, e.g., access point name (SSID), access point MAC address, etc.), time (such as, e.g., time of day, day of week, etc.) and location (such as, e.g., location of the mobile device correlated with, e.g., an on-board GPS system and/or other location identifying functionality).
b. In some preferred embodiments employing location identifying functionality, such as, e.g., GPS or the like, the location based information can be used to present results of evaluations pictorially to a user on a display of the mobile device so as to depict relative locations of such access points and evaluation results. By way of example, in some embodiments, the system can have a map database that can be used to display maps concurrently with access points and evaluation results in an overlaid fashion to facilitate observation and use. This feature can be presented in a manner generally similar to how common vehicle navigation systems depict points of interest on pictorial maps for users (e.g., to identify gas station locations and the like). In the present case, however, such would geographically depict locations of access points, along with evaluation results.
c. In some embodiments, the mobile device is configured to display of the evaluation in a manner such that results are prioritized according to a number of variables. By way of example, prioritizing could include a) order of presentation, b) color coding and/or c) displaying only results related to higher priority category(ies). By way of example, prioritization can be based on a one or more variable, such as, e.g., based on the access point's throughput performance, delay performance, Service Provider, security attributes (such as, e.g., open or security-enabled AP, etc.).

Figure 4:
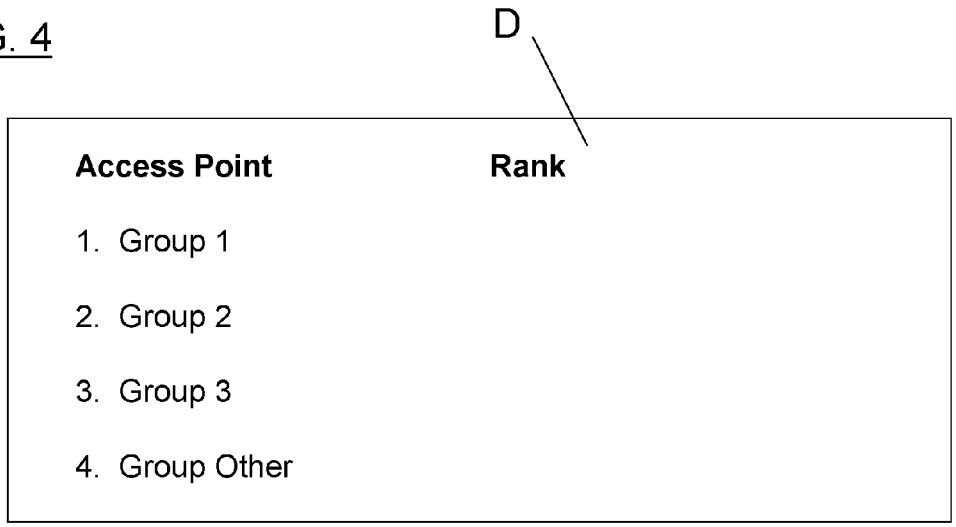
FIGS. 4 to 6 show illustrative display images (e.g., screen shots) on a display of a mobile device according to some illustrative examples of the present invention.
Figure 5:
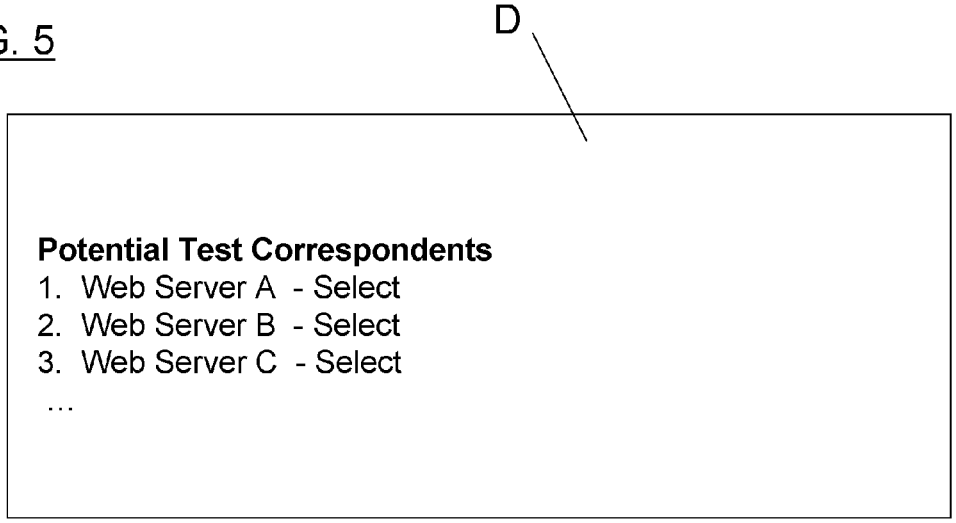
Figure 6:
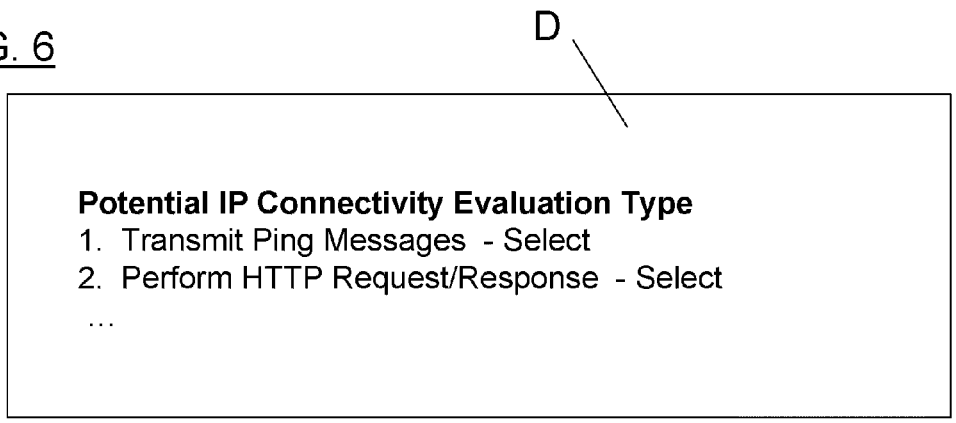

For illustrative purposes, FIG. 4 depicts an illustrative display screen D of a mobile device and depicts how, in some illustrative embodiments, the mobile device can be configured to display for the user access points evaluated according to certain groupings and according to certain rank orderings. In some embodiments, a user could be able to select one or more access point for evaluation and/or a test correspondent to be used in an evaluation by selecting from a list displayed to the user via, e.g., the user input IN as shown in FIG. 3. For example, a user could potentially manipulate a pointer device displayed on the display screen D to render a selection. By way of example, FIG. 5 shows an illustrative list of potential test correspondents to which a user can render a selection in some embodiments. As set forth above, in some embodiments, selection of the test correspondents would be automatically carried out and not involve user selection. In addition, it is noted that in some embodiments, a user can also be provided with the capability to select or guide other aspects of evaluation procedural steps, such as, e.g., selection of the IP connectivity evaluation type of method to employ. By way of example, as shown in FIG. 6, a user could be presented with a display on the display screen D of a list of potential evaluation types to choose from in some illustrative cases.

BROAD SCOPE OF THE INVENTION

While illustrative embodiments of the invention are set forth and described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is nonexclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example" and "i.a." which means "inter alia."

What is claimed is:

1. A system for evaluation of one or more access points to an access network prior to a wireless mobile device establishing a data communication session via one of the access point(s) to said access network, wherein:
said mobile device having at least one radio interface for communication with said one or more access point(s) to said access network;
said mobile device being configured to collect information broadcasted by the access point(s) and to detect link layer characteristics between the access point(s) and the mobile device;
said mobile device being configured to automatically select or enable user-driven selection of at least one test correspondent for evaluation of network level attributes of the access point(s); and
said mobile device having a connection manager that performs the evaluation of the access point(s) based on said broadcasted information and said link layer characteristics between the access points and the mobile devices and said network level attributes of said access point(s) prior to said mobile device establishing said data communication session via said one of the access point(s) to said access network,
wherein said mobile device configured to determine a collection of internet-accessible hosts based on a history of internet access attempts tied to a location of a particular server as well as said one or more access points serving said particular server at said location.

2. A system for evaluation of a plurality of access points to an access network prior to a wireless mobile device establishing a data communication session via one of the access points to said access network, wherein:
said mobile device configured to receive information wirelessly transmitted from multiple access points; and
said mobile device being configured to perform the evaluation of said plurality of access points via which said mobile device does not have an on-going data session based on both physical layer attributes of said access points and network level attributes of said access points so as to evaluate not only physical layer attributes but also networking status of said access points prior to said mobile device establishing said data communication session via said one of the access point(s) to said access network,
wherein said mobile device configured to determine a collection of internet-accessible hosts based on a history of internet access attempts tied to a location of a particular server as well as said access points serving said particular server at said location.

3. The system of claim 2, further said mobile device being configured to perform said evaluation based on communications with at least one test correspondent that exchanges IP-level or above packets with the mobile device.

4. The system of claim 2, wherein said physical layer attributes include one or more of signal strength, MAC addresses, nominal bit rates, and transmission technologies.

5. The system of claim 2, wherein said network level attributes include one or more of Internet connectivity, redirect-policies, and path performance.

6. The system of claim 2, wherein said mobile device is configured to present evaluation results via a display to a user of the mobile device.

7. The system of claim 2, wherein said mobile device is configured to prioritize the evaluations of said access points.

8. The system of claim 7, wherein said mobile device is configured to prioritize the evaluations based on one or more of the mobile user's past history with an access point, whether or not the access point's information is already stored in the user's profile, and the access point's operational status.

9. The system of claim 2, wherein said mobile device is configured to perform multiple evaluations of access points concurrently in parallel.

10. The system of claim 2, wherein said mobile device is configured with a user-driven mode in which a user physically initiates performance of said evaluation and/or physically selects access points based on said evaluation via a user interface.

11. The system of claim 2, wherein said mobile device is configured with an automatic mode in which the device automatically performs said evaluation and/or automatically selects access points based on said evaluation.

12. The system of claim 11, wherein said automatic mode includes said mobile device being configured to actively perform connectivity and performance scans.

13. The system of claim 2, wherein said evaluation includes grouping of access points.

14. The system of claim 13, wherein said evaluation includes ranking of access points.

15. The system of claim 14, wherein said evaluation includes determining an order of evaluation execution across groups.

16. The system of claim 13, wherein said groups include a group of entries associated with a detected connection that are ad-hoc or peer to peer, a group of access points that are already within a user's profile, and a group of access points that are security enabled but not part of the user's profile.

17. The system of claim 14, wherein said ranking is presented on a display for the user of the mobile device.

18. The system of claim 2, wherein said mobile device is configured to perform a connectivity evaluation with at least one test correspondent.

19. The system of claim 18, wherein said connectivity evaluation includes obtaining of an IP address and initiating data transfer with said at least one test correspondent.

20. The system of claim 19, wherein said mobile device is configured to present a list of test correspondents for user selection.

21. The system of claim 19, wherein said mobile device is configured to automatically select said test correspondent.

22. The system of claim 21, wherein said data transfer includes said mobile device being configured to transmit a ping message or an HTTP Request to said at least one test correspondent, and said mobile device being configured to store ping results or HTTP Responses.

23. The system of claim 2, wherein said mobile device is configured to perform a performance evaluation with at least one test correspondent.

24. The system of claim 23, wherein said performance evaluation includes end-to-end performance of an access point.

25. The system of claim 24, wherein said mobile device is configured to perform said end-to-end performance using evaluations of ping messages to record throughput and/or delay between the mobile device, the access point being evaluated and the test correspondent.

26. The system of claim 24, wherein said mobile device is configured to perform said end-to-end performance using evaluations of HTTP Request and Response messages based on evaluation of time elapse based on time-stamps of said messages, wherein said mobile device is configured to record, store and analyze times related to said messages.

27. The system of claim 2, wherein said mobile device is configured to operate in a single radio mode and to perform said evaluation while said radio is engaged in an on-going session over an existing connection by disassociating from a currently serving access point to evaluate another access point.

28. The system of claim 2, wherein said mobile device has multiple radio interfaces that can be operated independently and simultaneously to perform said evaluation by having certain radio interfaces operate as serving interfaces and other radio interfaces as scanning or evaluating interfaces.

29. The system of claim 2, wherein said mobile device is configured to display evaluation results and an aggregation of multiple result instances for each access point under evaluation.

30. The system of claim 29, wherein the mobile device is configured to present average, median, extreme or intervals of test results across testing correspondents for each access point under evaluation.

31. The system of claim 2, wherein said mobile device is configured to store results of said evaluation in a database.

32. The system of claim 31, wherein said mobile device is configured to analyze said results of said evaluation.

33. The system of claim 31, wherein said mobile device is configured to index said results of said evaluation based on parameters.

34. The system of claim 33, wherein said mobile device is configured to index said results of said evaluation based on at least one parameter from the group consisting of access point name (SSID), access point MAC address, time of day, day of week and location of the mobile device.

35. The system of claim 34, wherein said mobile device is configured to present results of said evaluation on a geographic map to enable visualization of access point locations and evaluation results in relation to the mobile device.

36. The system of claim 2, wherein said mobile device is configured to prioritize said evaluation results according to at least one variable from the group consisting of throughput performance, delay performance, service provider, and security attributes.

37. The system of claim 2, wherein said mobile device is configured to initiate said evaluation upon detection of a poor application-layer performance of an on-going application running on said mobile device.

38. The system of claim 2, wherein said mobile device is configured to vary said evaluations based on a detected battery power level of said mobile device.

39. The system of claim 38, wherein said mobile device is configured to limit said evaluations based on the mobile devices remaining battery power.

40. The system of claim 38, wherein said mobile device is configured to limit the number of evaluations based on the mobile devices remaining battery power.

* * * * *

UNITED STATES PATENT AND TRADEMARK OFFICE
CERTIFICATE OF CORRECTION

PATENT NO. : 8,345,599 B2  Page 1 of 1
APPLICATION NO. : 12/569719
DATED : January 1, 2013
INVENTOR(S) : Famolari et al.

It is certified that error appears in the above-identified patent and that said Letters Patent is hereby corrected as shown below:

In the Drawings

In Fig. 1, Sheet 1 of 4, delete " 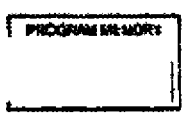 " and insert --  --, therefor.

In the Specification

In Column 4, Line 62, delete "23, 25." and insert -- 23, 24. --, therefor.

In Column 10, Line 45, delete "11 g," and insert -- 11g, --, therefor.

In Column 12, Line 41, delete "Connectivity" and insert -- Connectivity. --, therefor.

In Column 14, Line 15, delete "etc.)" and insert -- etc.). --, therefor.

In Column 15, Line 2, delete "relative" and insert -- relative. --, therefor.

Signed and Sealed this
Twenty-fifth Day of November, 2014

Michelle K. Lee
*Deputy Director of the United States Patent and Trademark Office*